(12) United States Patent
Spitzer et al.

(10) Patent No.: US 8,069,904 B2
(45) Date of Patent: Dec. 6, 2011

(54) METHOD FOR PRODUCING HOT STRIPS FROM LIGHTWEIGHT STEEL

(75) Inventors: Karl-Heinz Spitzer, Clausthal-Zellerfeld (DE); Hellfried Eichholz, Ilsede (DE); Markus Schäperkötter, Braunschweig (DE); Guido Bormann, Ilsenburg (DE)

(73) Assignee: SMS Siemag AG, Duesseldorf (DE)

( * ) Notice: Subject to any disclaimer, the term of this patent is extended or adjusted under 35 U.S.C. 154(b) by 533 days.

(21) Appl. No.: 11/722,448

(22) PCT Filed: Dec. 14, 2005

(86) PCT No.: PCT/DE2005/002276
§ 371 (c)(1),
(2), (4) Date: Nov. 17, 2009

(87) PCT Pub. No.: WO2006/066551
PCT Pub. Date: Jun. 29, 2006

(65) Prior Publication Data
US 2010/0059196 A1    Mar. 11, 2010

(30) Foreign Application Priority Data

Dec. 21, 2004 (DE) .......................... 10 2004 062 637
Nov. 1, 2005 (DE) .......................... 10 2005 052 774

(51) Int. Cl.
*B22D 11/00* (2006.01)
*B22D 11/12* (2006.01)
*B21B 1/46* (2006.01)

(52) U.S. Cl. ........ 164/462; 164/475; 164/476; 164/417; 29/527.7

(58) Field of Classification Search .................. 164/476, 164/417, 462, 475, 415; 29/527.7
See application file for complete search history.

(56) References Cited

U.S. PATENT DOCUMENTS 5,832,985 A * 11/1998 Pleschiutschnigg et al. . 164/476
6,290,787 B1    9/2001 Babbit et al.
(Continued)

FOREIGN PATENT DOCUMENTS

DE    197 58 108    1/1999
(Continued)

OTHER PUBLICATIONS

Steel research 74 (2003), No. 11/12, pp. 724-731 Direct Strip Casting (DSC)—an Option for the Production of New Steel Grades, Karl-Heinz Spitzer et al.

*Primary Examiner* — Kevin P Kerns
(74) *Attorney, Agent, or Firm* — Henry M. Feiereisen; Ursula B. Day

(57) ABSTRACT

In a method for producing hot strips from a deformable lightweight steel which includes as main elements Fe, Mn, Si and Al, melt is cast close to its final dimension in a horizontal continuous strip casting installation under a protective gas to form a pre-strip between 6 and 20 mm, and the temperature of the pre-strip is adjusted after complete solidification and before the beginning of a hot-rolling process. The pre-strip is passed through a device under a protective gas for homogenization in concert with a selective maintenance of the temperature, cooling or heating, and subsequently subjected to a hot-rolling process having at least one pass with a total degree of deformation of at least 50%, and is then reeled as a hot strip following the cooling process. The hot-rolling process is executed in-line or in decoupled manner depending on the ratio of casting speed to rolling speed.

26 Claims, 2 Drawing Sheets

U.S. PATENT DOCUMENTS

2001/0031376 A1* 10/2001 Fulton et al. .................. 428/650
2002/0104597 A1   8/2002 Frank et al.
2004/0069377 A1*  4/2004 Fortunati et al. .............. 148/111
2004/0079513 A1*  4/2004 Pircher et al. ................. 164/476
2006/0042727 A1*  3/2006 Li et al. ........................ 148/551

FOREIGN PATENT DOCUMENTS

JP         08 309406 A    11/1996

* cited by examiner

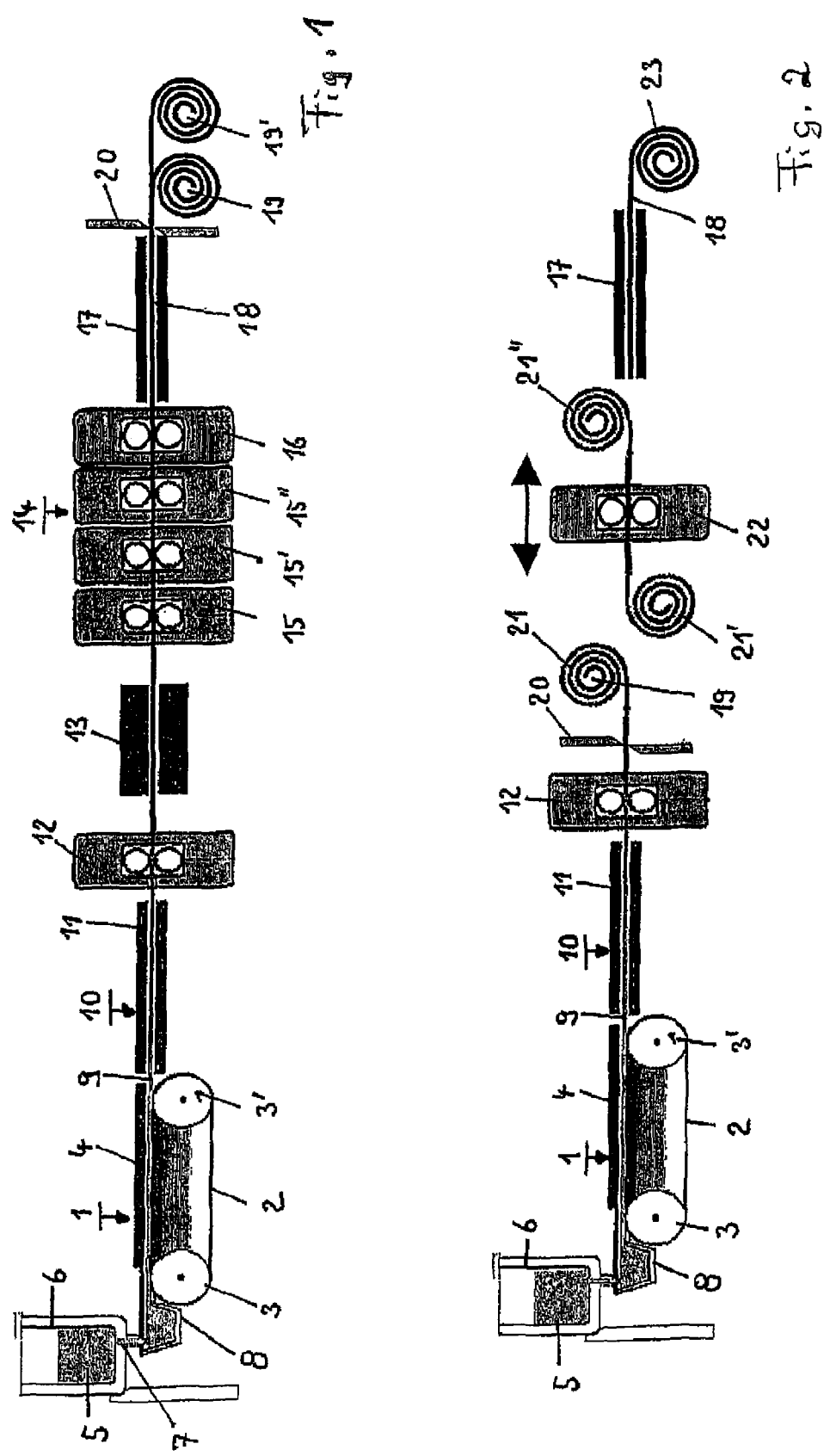

METHOD FOR PRODUCING HOT STRIPS FROM LIGHTWEIGHT STEEL

BACKGROUND OF THE INVENTION

The invention relates to a method for producing hot strips from a deformable lightweight steel which is especially suitable for cold deep drawing and includes as main elements Fe, Mn, Si and Al and which has a high tensile strength and TRIP and/or TWIP properties.

The method, set forth in the preamble, for producing hot strips from a deformable lightweight steel which is especially suitable for cold deep drawing is known (steel research 74 (2003), No. 11/12, pp 724-731).

The production of such steels of high manganese content has been marred by problems to ensure a fine-grained and isometric microstructure.

DE 197 58 108 C1 discloses a production method and production installation for continuous production of hot-rolled thin flat products. Melt from steel that has not been designated in greater detail is cast in a horizontal continuous strip installation close to its final dimension in a range between 5-18 mm and cooled in a controlled manner under a protective gas atmosphere before reaching the single-stand roughing train.

The pre-rolled hot strip is selectively cooled, heated or maintained at a temperature in a controlled fashion in a device downstream of the roughing train, and the edges of the hot strip are re-heated.

The single-stand roughing train is followed by a multi-stand finishing train, a delivery roller table with a device for cooling the hot strip as well as upstream and downstream coiling machines for coiling up the hot strip.

Downstream of the roughing train, the rolling temperature upstream of the multi-stand finishing train can be selectively adjusted in the austenitic or ferritic range or tailored in the transition from austenite to ferrite by the device for controllable cooling, heating or maintaining the temperature of the hot strip.

SUMMARY OF THE INVENTION

It is an object of the invention to provide a method for producing hot strips from a deformable lightweight steel which is especially suitable for cold deep drawing and which allows a reliable realization of a fine-grained, preferably isometric microstructure.

This object is attained by a method for producing hot strips from a deformable lightweight steel which is especially suitable for cold deep drawing and includes the main elements Fe, Mn, Si and Al and which has a high tensile strength and TRIP and/or TWIP properties, with melt being cast in a continuous strip casting installation close to its final dimension under a protective gas to form a pre-strip in a range between 6 and 20 mm, and with the temperature of the pre-strip being adjusted after complete solidification and before the start of a hot-rolling process, wherein the pre-strip passes through a device under protective gas for homogenizing in concert with a selective maintaining of the temperature, cooling or heating, and subsequently is subjected to a hot-rolling process having at least one pass and a total deformation degree of at least 50%, and after cooling down is reeled as hot strip, wherein depending on the ratio of casting speed to rolling speed, the hot rolling process is implemented in-line or decoupled.

According to the teaching of the invention, the pre-strip produced by continuous strip casting passes through a device under protective gas for homogenizing in concert with a selective temperature maintenance, cooling or heating. Subsequently, the pre-strip is subjected to a hot-rolling process having at least one pass and a total deformation degree of at least 50%. After the last pass, the hot strip is cooled down and reeled. The hot rolling process is implemented in-line or de-coupled, depending on the ratio of casting speed in relation to rolling speed. Preferably, the total deformation degree amounts to more than 70%.

The passage of the homogenization zone is intended to effect a temperature balance across the surface and a stress relief, regardless whether the temperature level is maintained, or is lowered or raised by cooling and heating, respectively.

The ratio of casting speed to rolling speed is crucial for the choice of in-line or separate hot-rolling process. When both speeds are about the same, in-line rolling is possible. However, when the casting speed is significantly smaller or greater than the rolling speed, the casting and hot rolling process must be decoupled from one another.

The speed is normally determined by the rolling speed in the first stand and must be sufficiently high to be able to establish the deformation in a particular temperature window. When the rolling speed is too low, the deformation temperature decreases and the required rolling forces rise excessively. Although it could be attempted to conform the possible casting speed to the respective rolling speed in the first stand by changing the length of the continuous strip casting machine, this, however, would preclude any possibility of variation.

In other words, when limited to one steel grade only, the installation could be configured to satisfy the condition casting speed=rolling speed in the first stand, but more likely is the use of such a installation for a wider spectrum of varying steel grade so that a decoupled installation design would take precedent.

Apart from the issue of the speed condition, recrystallization behavior is also of relevance. Both limit cases involve a complete recrystallization during deformation (dynamic) as opposed to a recrystallization after deformation (static). The actual conditions involve a hybrid form, whereby at one time or another dynamic or the static behavior is dominant depending on the conditions.

The proposed decoupling has the advantage that the casting speed can be selected in dependence on the alloy composition of the steel with respect to optimum solidification conditions, regardless of the cycle of the subsequent hot rolling process. In contrast thereto, the afore-mentioned in-line hot rolling has, however, the advantage of increased productivity, whereby the final thickness may be realized by the rolling operation either throughout or partway.

In in-line hot rolling, the microstructure has not sufficiently recrystallized so that the final adjustment of the material properties is preferably realized by a subsequent annealing process and/or combined annealing and cold-rolling processes.

When a decoupled operation is involved, the pre-strip is directly reeled in the simplest case after complete solidification and passage through the homogenization zone. This assumes that the casting structure of the pre-strip is so configured as to enable reeling and unreeling. Normally, the pre-strip is subjected to a first pass which is sufficient to effect at least a partial crystallization of the outer regions of the strip in order to be able to easily reel the strip.

The actual hot-rolling process is implemented in Steckel operation at defined temperature, with the finished hot strip being cooled and reeled after reaching the predefined deformation degree.

Depending on the installation layout, it may be required to adjust the coil before uncoiling to a predefined temperature.

As an alternative, the hot-rolling process may take place in a finishing line with at least three reductions in strip thickness.

Also in this procedure, it is considered advantageous to subject the pre-strip to a first pass. Depending on the alloy composition and desired microstructure configuration, it may be necessary to provide intermediate heating between the first pass and the finishing line.

All thus-produced hot strips can be deep-drawn cold, and targeted cold forming processes (e.g. rolling, stretching, deep drawing) with optional interposed annealing processes make it possible to adjust a wide spectrum of different properties with respect to strength, ductility, and structural isometry.

The decision as to whether only recrystallization annealing, or only cold forming, or a combination of both, is necessary to be carried out after the last hot forming process depends always on the extent of the attained recrystallization after hot forming and on the wanted technological properties including the structural isometry.

The method according to the invention is preferably suitable for the production of hot strips from a lightweight steel with following contents C=0.04-1.0%, Mn=9-30%, Si=0.0-6.0%, Al=0.05<12%.

Beneficial values are realized at a Si content from 2.0-4.0% and an Al content of 2.0-3.0%. The Mn content may be adjusted to an upper range (22-30%) and a lower range (9-18%), depending on whether TRIP or TWIP properties should prevail. The average Mn range (18-22%) is preferred for a balanced ratio between TRIP and TWIP properties.

BRIEF DESCRIPTION OF THE DRAWING

Further features, advantages and details of the invention are apparent upon from the following description of several exemplified embodiments depicted in a drawing, in which:

FIG. 1 shows schematically the process sequence according to the invention for the condition casting speed=rolling speed, FIG. 2 shows schematically the process sequence according to the invention for the condition casting speed≠rolling speed, with the variation Steckel operation, FIG. 3 like FIG. 2 but with variation finishing line.

DETAILED DESCRIPTION OF PREFERRED EMBODIMENTS

Figure 3:
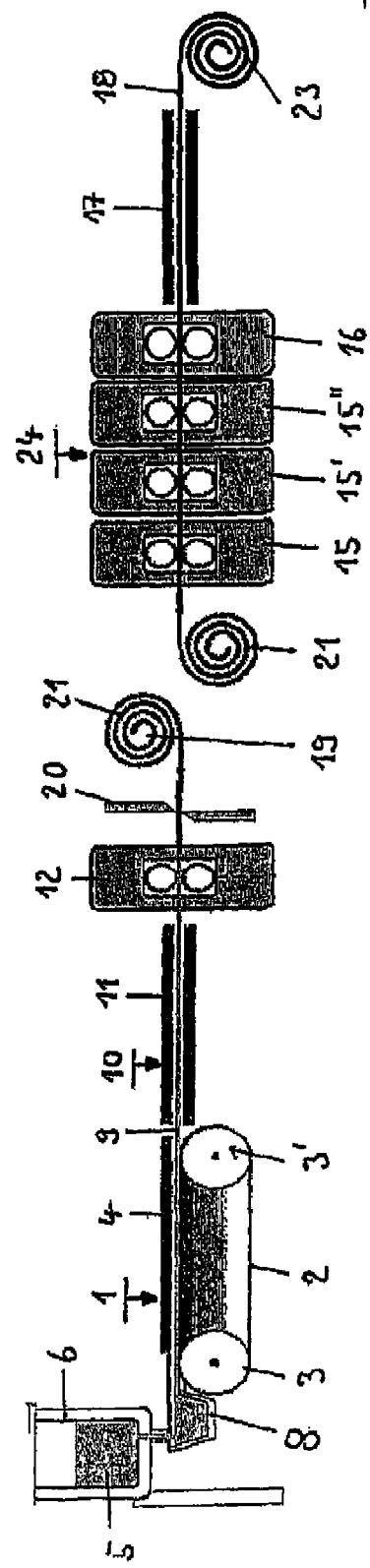

FIG. 1 illustrates schematically a process sequence according to the invention for the condition casting speed substantially equal to rolling speed. Upstream of the hot-rolling process is the casting process with a horizontal continuous strip casting installation 1, comprised of a revolving conveyor belt 2 and two deflection pulleys 3, 3'. A lateral seal 4 can be further seen to prevent the supplied melt 5 from flowing off to the right and left of the conveyor belt 2. The melt 5 is transported by means of a ladle 6 onto the horizontal continuous strip casting installation 1 and flows through a bottom opening 7 into a tundish 8. This tundish 8 is constructed as an overflow tank.

Not shown are the equipments for intense cooling of the underside of the upper strand of the conveyor belt 2 and the complete envelope of the continuous strip casting installation 1 with respective protective gas atmosphere.

After depositing the melt 5 onto the revolving conveyor belt 2, the intense cooling causes solidification and formation of a pre-strip 9 which is substantially solidified at the end of the conveyor belt 2.

Following the continuous strip casting installation 1 is a homogenization zone 10 for temperature compensation and stress relief. The homogenization zone includes a heat-insulated housing 11 and a roller table not shown in detail here. This device may be selectively used to maintain the temperature of the pre-strip 9 or to further cool down or, as an alternative, to slightly heat up the pre-strip 9.

The subsequent first stand 12 is constructed either as a pure driver unit with a slight initial pass or as rolling unit with a predefined initial pass.

Depending on the alloy composition and desired microstructure formation, the pre-strip feeds directly into the finishing line, or an intermediate heating is required. Advantageously, this is realized by inductive heating, e.g. in the form of a coil 13. The actual hot forming is implemented in the following finishing line 14, with the first three stands 15, 15', 15" effecting the actual reduction in strip thickness whereas the last stand 16 is constructed as smoothing rolls.

Following the last pass is a cooling zone 17 in which the finished hot strip is cooled down to the reeling temperature.

Shear 20 is arranged between the end of the cooling zone 17 and reel 19, 19'. The shear 20 has the task to separate the hot strip 18 transversely as soon as one of the two reels 19, 19' has been fully wound. The leader of the following hot strip 18 is then routed to the second free reel 19, 19'. This ensures that the pull on the strip is maintained over the entire strip length. This is especially of importance when producing thin hot strips.

FIG. 2 shows the process sequence for the condition that casting speed≠rolling speed. This means that the casting speed is significantly greater or smaller than the rolling speed.

As melt 5 is deposited upon the continuous strip casting installation 1 and the solidification to form a pre-strip 9 is realized in a same manner as the process depicted in FIG. 1, a repetition thereof is omitted.

As already explained with reference to FIG. 1, the first stand 12 following the homogenization zone 10 may be configured only as driver unit or as rolling stand with predefined reduction in strip thickness. To reduce the function simply to a driving of the pre-strip 9 is only possible when the casting structure permits a reeling of the pre-strip 9. Normally, a certain initial pass is always necessary.

In order to be able to remove the wound coil 21 from reel 19, a shear 20 is arranged downstream of the first stand 12 for transverse separation of the pre-strip 9. Depending on the cycle sequence, there may be a need for provision of a second reel (not shown here)

The actual hot forming is carried out decoupled from the casting process in a separate installation.

In this exemplified embodiment, a reversing stand 22, also called "Steckel mill", is used which rolls alternatingly from left to right and from right to left and again reels coils 21', 21". Not shown here is the option to set the temperature during rolling in so-called heat retaining boxes. Also not shown is the option to provide a furnace between casting installation and reversing stand 22 to adjust the wound coil 21 to a defined temperature before being unreeled.

After the last hot forming pass, the right delivery side of the reversing stand 22 is reversed so that the finished hot strip 18 passes through a cooling zone 17 and the hot strip 18 is again reeled to a finished coil 23.

As opposed to FIG. 2, FIG. 3 illustrates the execution of the actual hot forming in a finishing line 24. The reeled coil 21 is hereby transported to the finishing line 24 and the strip leader is threaded into the first stand 15 of the finishing line 24.

In this exemplified embodiment, the finishing line 24 includes three rolling stands 15, 15', 15" and a smoothing rolls stand 16. After leaving the smoothing rolls stand 16, the finished hot strip 18 passes through a cooling zone and is reeled to a finished coil 23 at predefined reeling temperature.

What is claimed is:

1. A method for producing hot strips from a deformable lightweight steel containing as main elements Fe, Mn, Si and Al, said method comprising the steps of:
   casting a melt of the steel in a continuous strip casting installation close to its final dimension under a protective gas to form a pre-strip in a range between 6 and 20 mm;
   passing the pre-strip through a device under protective gas for homogenizing while adjusting a temperature of the pre-strip;
   subjecting the pre-strip to a hot-rolling process having at least one pass and a total deformation degree of at least 50%;
   cooling down the pre-strip to produce a hot strip; and
   reeling the hot strip,
   wherein the hot rolling process is implemented in-line with the casting step or decoupled therefrom in dependence on a ratio of a casting speed to a rolling speed.

2. The method of claim 1, wherein the steel has a composition which allows cold deep drawing and has a high tensile strength and TRIP and/or TWIP properties.

3. The method of claim 1, wherein the adjustment of the temperature includes a process selected from the group consisting of maintaining the temperature, lowering the temperature, and raising the temperature.

4. The method of claim 1, wherein the total deformation degree is >70%.

5. The method of claim 1, further comprising the step of subjecting the pre-strip to a first pass immediately after passage of the homogenization zone.

6. The method of claim 1, wherein the hot rolling process is executed in-line, when the casting speed is about the same as the rolling speed.

7. The method of claim 5, further comprising the step of heating the pre-strip after the first pass, wherein the hot-rolling process includes at least one reduction in strip thickness before the hot strip is cooled and reeled.

8. The method of claim 7, wherein the hot-rolling process includes at least three reductions in strip thickness.

9. The method of claim 5, further comprising the steps of reeling the pre-strip after the first pass to a coil, when the casting speed is significantly less or greater than the rolling speed, and unreeling the pre-strip before subjecting the pre-strip to the hot-rolling process which is decoupled from the casting step as a separate step.

10. The method of claim 9, wherein the hot-rolling process is carried out in Steckel operation at set temperature and the hot strip is cooled and reeled after reaching the predefined deformation degree.

11. The method of claim 9, further comprising the step of maintaining the coil for the hot-rolling process at a predefined temperature before being unreeled.

12. The method of claim 9, wherein the hot-rolling process is executed in a finishing line and the hot strip is cooled and reeled after passing a last stand.

13. The method of claim 1, further comprising the step of only recrystallization annealing the hot strip after a last hot forming step.

14. The method of claim 1, further comprising the steps of unreeling the hot strip and subjecting the hot strip to cold forming with at least one pass.

15. The method of claim 14, wherein the cold forming step includes several passes.

16. The method of claim 15, further comprising the step of annealing between the passes.

17. The method of claim 14, further comprising the step of recrystallization annealing the reeled hot strip before cold forming or in-line.

18. The method of claim 1, wherein the steel contains carbon in the range of 0.04 to 1.0 weight-%.

19. The method of claim 1, wherein the steel contains manganese in the range of 9.0 to 30.0 weight-%.

20. The method of claim 1, wherein the steel contains silicon in the range of 0.0 to 6.0 weight-%.

21. The method of claim 1, wherein the steel contains aluminum in the range of 0.05 to 12 weight-%.

22. The method of claim 20, wherein the Si content is 2.0 to 4.0 weight-%.

23. The method of claim 21, wherein the Al content is 2.0 to 3.0 weight-%.

24. The method of claim 19, wherein the Mn content is 9 to 18 weight-%.

25. The method of claim 19, wherein the Mn content is 18 to 22 weight-%.

26. The method of claim 19, wherein the Mn content is 22 to 30 weight-%.

* * * * *

UNITED STATES PATENT AND TRADEMARK OFFICE
CERTIFICATE OF CORRECTION

| | | |
|---|---|---|
| PATENT NO. | : 8,069,904 B2 | Page 1 of 1 |
| APPLICATION NO. | : 11/722448 | |
| DATED | : December 6, 2011 | |
| INVENTOR(S) | : Spitzer et al. | |

It is certified that error appears in the above-identified patent and that said Letters Patent is hereby corrected as shown below:

On title page, Item [73] Assignee: replace "SMS Siemag AG, Duesseldorf (DE)" with
--Salzgitter Flachstahl GmbH, Salzgitter (DE) and
SMS Siemag AG, Duesseldorf (DE)--.

Signed and Sealed this
Third Day of April, 2012

David J. Kappos
*Director of the United States Patent and Trademark Office*